March 24, 1931. W. HARLANDT 1,797,864
TUBE DISPATCH SYSTEM AND THE LIKE
Filed Oct. 11, 1928 5 Sheets-Sheet 1

Inventor
Walther Harlandt
by
Lotka, Kehlenbeck & Farley
Attorneys

Patented Mar. 24, 1931

1,797,864

UNITED STATES PATENT OFFICE

WALTHER HARLANDT, OF ALTGLIENICKE, NEAR BERLIN, GERMANY, ASSIGNOR TO DEUTSCHE TELEPHONWERKE UND KABELINDUSTRIE AKTIENGESELLSCHAFT, OF BERLIN, GERMANY, A CORPORATION

TUBE-DISPATCH SYSTEM AND THE LIKE

Application filed October 11, 1928, Serial No. 311,751, and in Germany October 11, 1927.

Devices are known by which a vehicle during travelling can automatically produce signals or other operations at previously prepared points of the track. Such devices have been particularly proposed for tubular post stations in order to cause the travelling box to displace switches in a predetermined manner as may be required to direct the box over its intended course. The box, or more generally the vehicle, is fitted either with stops which are arranged at a predetermined distance apart and, at the point of the track in question, co-operate with stops or electric contacts arranged at the same distance apart, or the boxes themselves carry directly contact members adapted to come into contact with contact members on the point of the track. In both cases the vehicle has its speed reduced by the mechanical resistance of the stops or contact members with the result that a tubular post box may be directly jammed.

The object of the present invention is to provide a device in which such a reduction does not take place. The vehicle for this purpose is provided with layers of magnetically effective material (for example iron) which are arranged at definite relative intervals. At the points of the track at which the automatic operation is adapted to take place magnet fields are so provided on the track section that they have the same relative spacing as the layers on the vehicle and on the passage of the vehicle are varied so that currents are induced in the windings mounted on the magnet cores.

At each track point where an operation is to be produced there are provided at least two magnetic fields the induced currents of which co-operate in order to produce the desired action at the track point. A particular vehicle can therefore produce such an action only at that track point of which the magnet fields have the same spacing apart as the layers on the vehicle.

At very high speeds of travel, as occur for example in the case of modern tubular post operation the influencing of the magnetic field by the passing box is only of very short duration so that the operation becomes uncertain. This is particularly the case when dealing with operations of the receiver which are intended for example for producing movement of switch points, where it is necessary for the vehicle to influence the receiver for a relatively long period of time. In this case the number of magnet fields which are influenced by the same vehicle are increased so that the same action is transmitted a number of times in quick succession to the receiver. The magnet field pairs can for this purpose be interengaged with one another and further overlap one another so that the fields have a shorter spacing apart than the layers on the vehicle.

There are various possibilities for the co-operation of the magnet fields. For example each induced winding may be short circuited across a relay and the armatures of all the relays may be placed in series in a local circuit containing a common relay. Or the induced currents may be conducted to a relay without mass, a cathode tube. Or the windings which are induced simultaneously can be placed directly in series in the circuit of the last mentioned relay so that the induced voltages of the windings are added together at the terminals of the relay.

In this case, for the purpose of preventing the induced voltage of one winding being sufficient to energize the relay, in the event of accidental higher speed of the box, an additional winding is provided on each magnet core and these windings are all arranged in series in a common short circuit. Instead of adding together the induction currents of the magnet windings these may be multiplied together by using them for energizing magnet fields suitably arranged apart and producing a rotary field.

In a general manner the magnet field may be formed either of permanent magnets or of electro-magnets which may be energized by continuous or alternating current.

In the latter case it is possible to use an economizing circuit for the windings so that the energizing windings also directly conduct the inducing current which becomes effective in the local circuit.

For the purpose of amplifying the action transmitted to the local circuit the currents induced in the windings are first conducted to the conductor circuits of cathode tubes in such a manner that the cathode tubes act at the same time as amplifiers.

In order to enable the boxes to act as required first on one and then on another section point the layers are made adjustable as is well known.

The cores of the magnet fields are preferably so constructed that they engage the travelling tube with their poles from two sides.

In order to enable the magnet fields to be placed close together and at the same time to ensure the individual action of each, the pole pieces of the magnet cores are lined on both sides with dia-magnetic material (bismuth) or with a good conducting material, for example copper, whereby the magnetic field, in the latter case by the formation of eddy currents in the copper, is limited and its action is separated from the adjacent field.

The track tube or guideway, which is mostly made of steel, must at the points where the magnet fields are provided, consist of non-magnetizable material (brass, glass and so forth). At this point it is preferably of reduced diameter in order to reduce the magnetic resistance which is formed by the air gaps between the pole pieces and the layers of the box. In order to reduce this resistance still further soft iron insertions are inserted into the track tube at the point at which the pole pieces of the magnets are located. These insertions must not form a closed ring as otherwise a magnetic short circuit would be formed between the magnet poles which would prevent the action of the box layers on the magnet field.

In the accompanying drawings are illustrated various forms of construction in accordance with the invention.

Figures 1, 2:
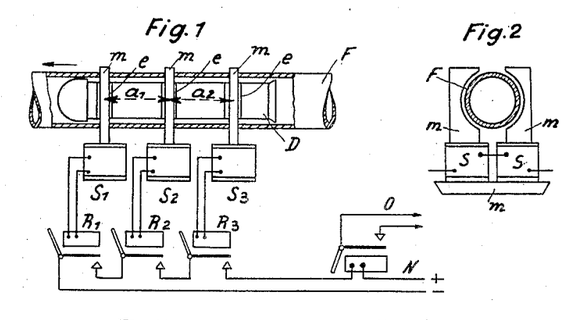
Figures 1 and 2 are longitudinal and cross-sections respectively, showing a point of a tubular post section provided with three magnet fields.

In Figure 1 is illustrated the moment at which the box or carrier D traveling in the tube F in the direction of the arrow arrives at the point at which it reaches and influences the system consisting of three magnet fields $S_1$, $S_2$, $S_3$. For this purpose the box or carrier is provided with three rings $e$ set apart at the distances $a_1$ $a_2$. These rings $e$ are arranged at the same distances apart as the pole pieces $m$ of the three magnets which for example consist of permanent magnets. Figure 2 shows a cross section of the tube from which the shape of a magnet will be seen. Between the two pole pieces of the magnet, which embrace the track tube or guideway almost completely from both sides there is formed a magnet field in which the section of the tube is located. The tube consists, at least at this point, of brass, so that its wall does not form a magnetic short circuit.

As soon as the ring $e$ of the passing box enters the space between the pole pieces the magnetic field is temporarily changed namely strengthened, as the ring consists of iron. (If the ring consisted of dia-magnetic material the field would be weakened, which is also useful.) Consequently a temporary current is induced in the winding $s$ (Figure 2). This current as shown in Figure 1 is supplied to a relay $R_1$, $R_2$ or $R_3$. Each relay winding is connected directly, i. e. without the insertion of a source of current, to the magnet winding appertaining thereto. As the armature contacts of the three relays are located in series in the circuit of a third relay N this is energized and closes at its armature the local circuit O in which for example is included the operating magnet for a switch.

If one of the rings $e$ is omitted or is arranged at a different distance on the box only two of the systems $S_1$ $S_2$ $S_3$ would be induced simultaneously and therefore only two of the relay armatures would be attracted so that the relay N would not be energized. A box different from the box D would therefore not operate a switch at this point.

Figure 3:
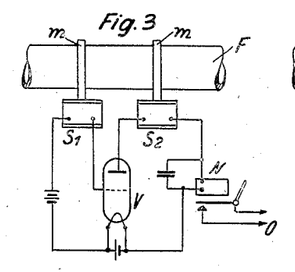
Figure 3 is an exterior view illustrating a similar point provided with two magnet fields and a cathode tube.

In Figure 3 the section point at which the local circuit O is to be closed is only provided with two magnet systems $S_1$ $S_2$. The simultaneously induced currents are in this case not conducted to separate relays but to the conductor circuits of a cathode tube V in the plate circuit of which is located the relay N which controls the local circuit O.

The relay N is bridged for known reasons by a condenser. The current induced in the system $S_1$ is supplied to the grid circuit of the cathode tube V whilst the current induced in the system $S_2$ is supplied to the anode circuit of the same cathode tube. Only when both currents influence simultaneously the cathode tube V will a current flow through the relay N so that only in this case is the local circuit O closed. A box on which the iron rings e are not arranged at the same distance apart as the pole pieces n of the magnets $S_1$ $S_2$ cannot therefore actuate a switch or a signal which is dependent on the circuit O.

In Figure 4 the relay N is again arranged in the anode circuit of a cathode tube V for the purpose of controlling the local circuit O, but in this case the windings of the systems $S_1$ $S_2$ are both arranged in the grid circuit of the tube V, which for this purpose is provided with two grids.

Figure 5:
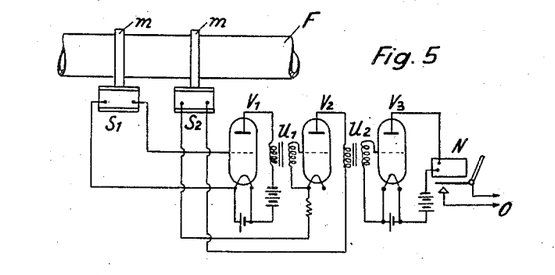
Figure 5 is a corresponding view illustrating a similar point with a number of cathode tubes.

In Figure 5 the winding of one system $S_1$ is connected to the grid circuit of the first cathode tube $V_1$, the winding of the second system $S_2$ with the anode circuit of a second cathode tube $V_2$ and both tubes are coupled together by the transformer $U_1$ as amplification stages. The relay N, which controls the local circuit O is located in the anode circuit of a third tube $V_3$, which is coupled to the tube $V_2$ in such a manner by a transformer $U_2$ that a further stage of amplification is formed.

Figure 4:
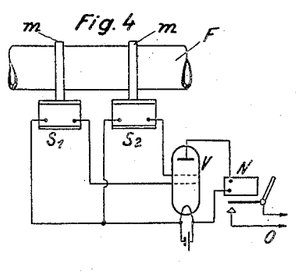
Figure 4 is a similar view showing a point having a different circuit arrangement of the cathode tube.

The arrangements according to Figures 3 to 5 have the advantage that the series contacts on the armatures of the relays R (Figure 1), which are readily exposed to disturbances, are eliminated and the relays R are rendered unnecessary. The amplification arrangement according to Figure 5 is particularly suitable in cases where the current induced in the separate systems S is extremely weak, for example by reason of a high speed of travel of the box.

Figure 6:
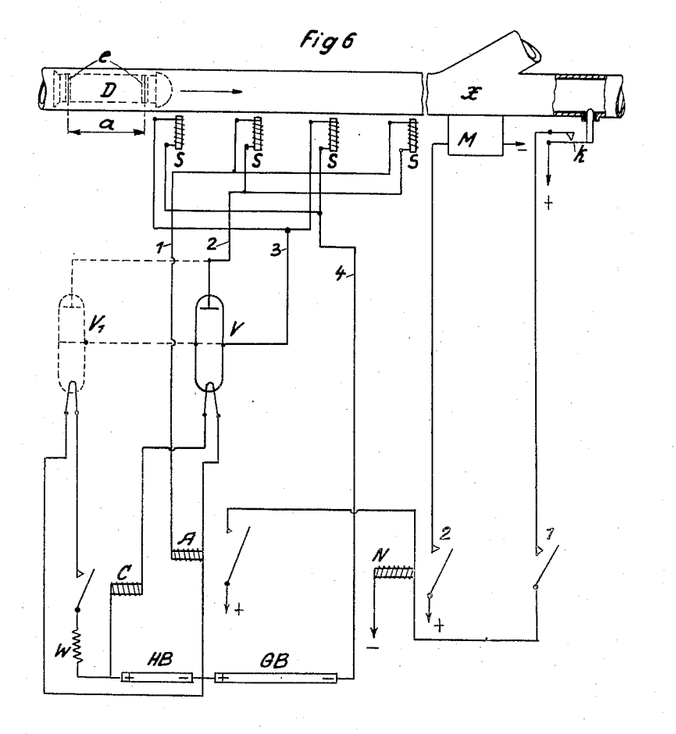
Figures 6 and 7 illustrate a similar point with a number of co-operating pairs of magnet fields in different arrangements.

Another arrangement for the same purpose as last described is illustrated in Figure 6. The box B travelling in the tube F in the direction of the arrow is provided with two iron rings e separated by the distance a. Adjacent the travelling pipe are arranged in series for example four permanent magnets with their poles in the same direction.

The windings s of the magnet fields are connected in pairs alternately to the conductors 1, 2 and 3, 4 and by means of these to the circuits of a cathode tube V in such a manner that the conductors 1, 2 close the anode circuit, in which the relay A is located, whilst the conductors 3, 4 close the grid circuit.

When the relay A attracts its armature it switches in the relay N. The latter then closes a locking circuit containing the armature contact 1 and the tube contact k. The relay N further closes, by its armature contact 2, the circuit O which contains the operating magnet for the switch M. The relay N and the switch M remains in operation until the box D reaches the tube contact k, whereupon the locking circuit of the relay N is interrupted.

GB indicates the grid battery, HB the heating battery. In the heating circuit of the tube V is included a relay C which is adapted to switch in a reserve tube $V_1$ when the tube V is rendered inoperative by the breakage of the filament. The resistance w serves for balancing the relay C for the heating circuit of the tube $V_1$. The battery voltages are so selected that normally no current passes through the tube.

The arrangement operates in the following manner. When the box D reaches the position in which its two iron rings e are each opposite a magnet then by the simultaneous induction of the windings s of both magnets the voltage at the electrodes of the tube V is increased in such a manner that a current now passes through the tube which causes the relay A to respond. This produces an energization of the relay N and closing of the circuit O at the contact 2 of the relay N. When the box on further movement reaches with this first iron ring the third magnet field the windings s of the second and third magnet field are simultaneously energized by the two iron rings which produces the same action as just described. On further movement of the box the windings s of the third and fourth magnet field are simultaneously energized and the same action is again obtained.

By the multiple action of the two iron rings on the entire magnet field group there is effected a multiple energization of the relay A so that the latter will attract its armature with certainty. At a higher speed of movement of the box further magnet fields would be provided in a similar manner to that shown in Figure 6 and connected to the conductors 1, 2 and 3, 4.

Figure 7:
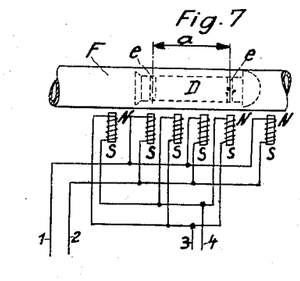

Figure 7 shows another arrangement of the magnetic fields in which between two fields, which are influenced simultaneously by the iron rings of the box, there is always located a non-influenced field. In this manner there is obtained a shorter constructional length of the entire magnetic field group. The magnetic fields are again connected alternately to the conductors 1, 2 and 3, 4.

Figure 8:
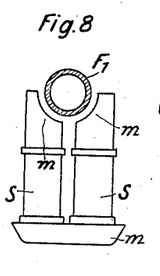
Figures 8 and 9 show a cross-section and side elevation of the travelling pipe at the point of a magnet field.
Figure 9:
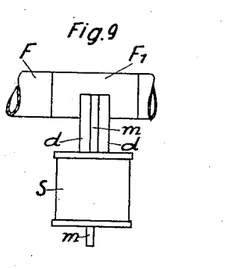

Figures 8 and 9 show in section the track tube F and the construction of a separate magnet field consisting of the permanent horseshoe magnets m of which the two poles surround the track tube for one-half on one side thereof. The pole of the permanent magnet m is lined on both sides with diamagnetic material b for the reasons previously stated. The track tube F consisting in the usual manner of steel, is interrupted at the point where the magnet field is located and replaced by an intermediate member $F_1$ of brass.

Figure 10:
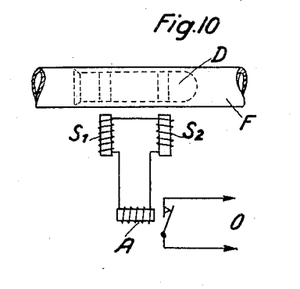
Figures 10 to 12 are elevations showing the adding and multiplying circuits of the magnet fields.

Instead of adding the simultaneously induced currents on relay armatures, as in Figure 1, or in tube circuits, as in Figures 3 to 6, they may be directly added in a relay winding which is included in series with the induced windings. Figure 10 shows such an arrangement. The windings of the magnet systems $S_1$ and $S_2$ are arranged in series together and with the winding of a relay A in a short closed circuit. The relay A controls the local circuit O.

Figure 11:
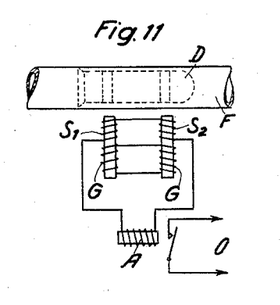

In Figure 11 there is provided on each magnet core an additional winding G which windings are connected together in the form of a common short circuit. This ensures a security that, in the event of accidental higher speed of the box, the simple current induced in $S_1$ or $S_2$ acquires a strength which causes the relay A to respond. The short circuit of the windings G is in this case caused to perform work whereas in the case of the simultaneous induction of the two windings $S_1$ $S_2$ it remains ineffective.

Figure 12:
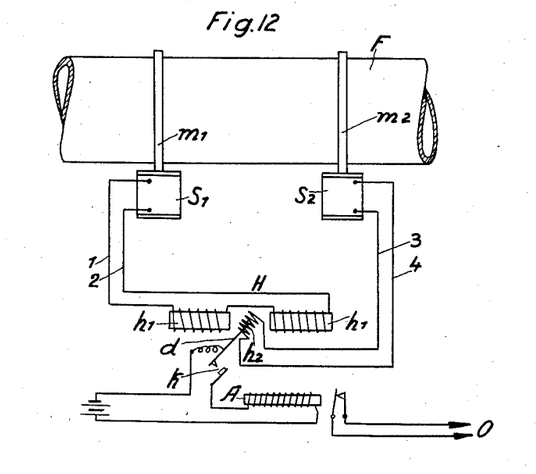

Figure 12 shows an arrangement in which an amplification of the simultaneously induced currents takes place. The winding $S_1$ of the permanent magnet $m_1$ is connected by conductors 1, 2 to the stationary coils $h_1$ of a dynamometric rotary field arrangement, whereas the winding $S_2$ of the permanent magnet $m_2$ is connected by the conductors 3, 4 to the movable coil $h_2$ of this arrangement which instead of a pointer carries a contact arm $d$. This contact arm closes at K the circuit of a relay A when the coil $h_2$ is moved from its position of rest. The relay R in turn controls the circuit O of the switch magnet not shown.

When the first iron ring of the box, entering for example at the left-hand end, passes through the field of $m_1$ only the coil $h_1$ receives current, and the coil $h_2$ remains at rest. When the same ring of the box disappearing to the right passes through the field of $m_2$ only the coil $h_2$ receives current.

It now also remains at rest. In between there is a moment at which the first iron ring of the box passes through the field $m_2$ simultaneously as the second iron ring passes through the field of $m_1$. At this moment both coils $h_1$ $h_2$ carry current and in consequence of the multiplying field action a powerful movement of the coil $h_2$ takes place which consequently closes the contact K and switches in the relay A. As the coil $h_2$ by reason of its return spring and the like immediately again returns into the position of rest suitable retarding means, which maintain the switching action of the contact K for a sufficiently long time, are unnecessary either on the relay A itself or in the local circuit O.

A box of which the iron rings are not arranged at the same distance apart as the poles of the magnets $m_1$ $m_2$ has no effect on the instrument H as simultaneous inductions never occur in the windings $S_1$ $S_2$.

If the magnets $m_1$ $m_2$ are electro-magnets, the energizing coil form a circuit separate from the induction coils $S_1$ $S_2$. In a similar manner the coils $h_1$ $h_2$ of the rotary field system may be superimposed on continuous current conducting coils and co-operate with these in that by reason of the latter coils they disturb the position of rest of the contact arm $d$. In a general manner it is possible to control an opening contact instead of a closing contact K.

By reason of the multiplying action of the currents induced in $S_1$ and $S_2$ the arrangement responds at low speeds of travel, and is therefore more sensitive than if each current was supplied separately to a relay.

Figures 13 to 23 show circuits of induced windings for arrangements in which they are to serve simultaneously for energizing the magnet systems $S_1$ $S_2$ which are formed by electro-magnets instead of by permanent magnets.

Figures 13, 14:
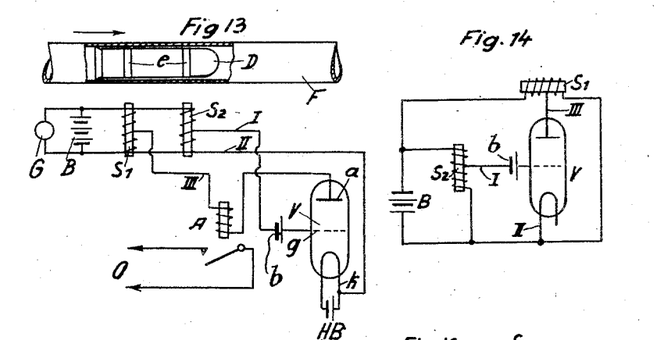
Figures 13 to 23 are diagrammatic views illustrating the economizing circuit for electro-magnetic fields.

In Figure 13 the energizing windings of the systems $S_1$ $S_2$ are arranged in parallel with a source of current, for example a battery B or a continuous current or alternating current generator and are thus constantly energized.

The induced currents of the magnet systems $S'$, $S^2$ are conducted to a cathode tube V as in Figure 3. There is provided a heating battery HB for the filament $k$ of the tube, a grid battery $b$ on the grid $g$ of the tube and a relay A, controlling the local circuit O, in front of the anode $a$ of the tube. The conductors I, II, III of the tube are as shown connected to the windings of the electro-magnets $S_1$ $S_2$. Figure 14 shows the circuit more diagrammatically. It will be seen that the energizing windings of the electro-magnets $S_1$ $S_2$ which are arranged in parallel in the circuit of the battery B, are connected to the anode and the grid of the tube B on the principle of the economizing transformer.

Figure 15:
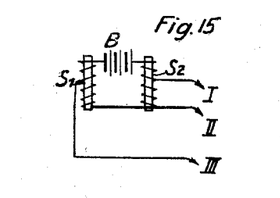
Figure 16:
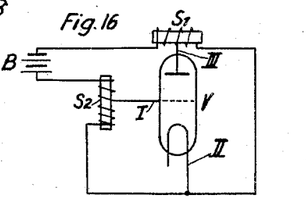

Figures 15 and 16 show another possible economizing circuit which will be readily understood without further explanation. This only differs from Figures 13 and 14 in that the electro-magnets are supplied in series, instead of in parallel, from the battery B.

Figure 17:
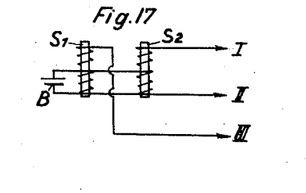
Figure 18:
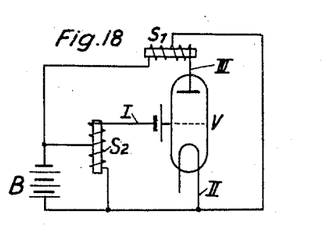
Figure 19:
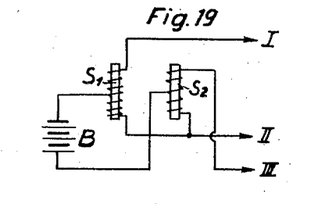
Figure 20:
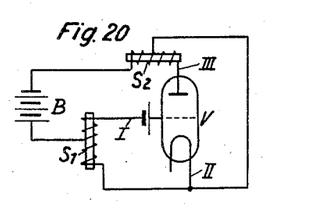

Figures 17 and 18 show an economizing circuit with a transforming-up arrangement. Half of the electro-magnet windings are arranged in parallel and connected to the battery B. Figures 19 and 20 illustrate a similar arrangement but with the halves of the electro-magnet windings arranged in series in the battery circuit.

Figure 21:
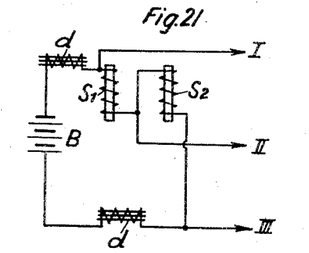
Figure 22:
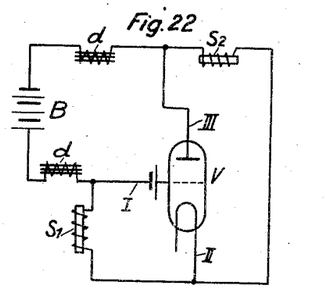

The circuit according to Figures 21 and 22 will be understood from Figures 13 and 14 when the choke coils D are included and the conductors I, II, III are arranged between these coils and the electro-magnets.

Figure 23:
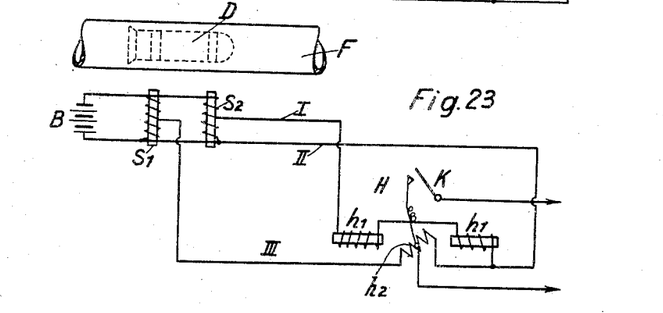

Figure 23 shows the circuit according to Figure 13 in combination with a choke coil instrument H of which the contact arm, provided instead of a pointer closes the contact K when the power action normally present between the stationary coil $h_1$ and the movable coil $h_2$ is varied by the occurrence of the voltages induced in $S_1 S_2$.

If for the reasons above stated there is inserted in the track tube which otherwise consists of steel, a reduced brass tube at the point of the magnet system, the connection of the brass tube to the steel tube is produced by a gradual enlarging of the brass tube.

Figure 24:
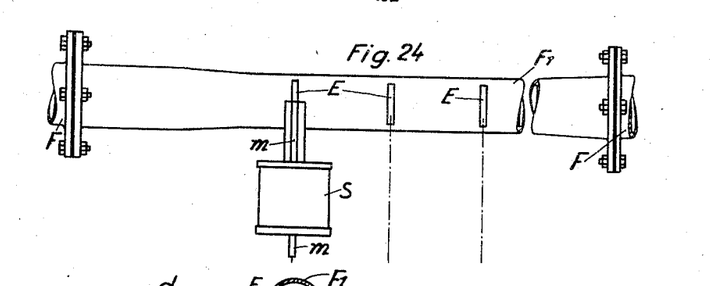
Figures 24 and 25 show a side elevation and cross section of a travelling pipe insertion with soft iron insertions.

The internal diameter of the brass tube can be so reduced that the box can still just pass therethrough. Figure 24 shows such an arrangement in which, for the reason above stated there are fitted into the brass tube, at the point at which the magnet poles are inserted, soft iron insertions in such a manner that the magnetic circuit, irrespective of air gaps, is only closed by iron, namely, by these insertions and the iron bodies of the box. By means of this arrangement it is possible to arrange a number of magnet fields closely together side by side without any relative influence between them as the interposed brass serves as a screen. The iron insertions consists of two ring segments each of which is opposite a magnet pole. The ends of the segments must not abut so as to avoid a magnetic short circuit by the segments.

Figure 25:
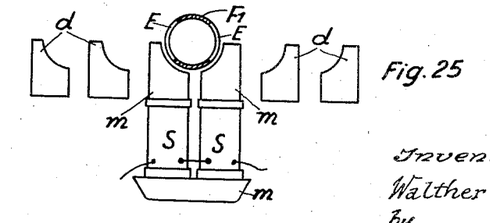

The brass tube $F_1$, reduced at the middle, is inserted between the ends of the steel tube F by bolted flanges. The reduced middle portion is on each longitudinal side provided for example with three insertions E of soft iron of which the insertion will be seen from the section shown in Figure 25. Each insertion E is opposite a pole of a magnet $m$ which carries the induction coils S. When the travelling box with its iron ring comes between two oppositely disposed segments E the field of the magnets is modified and the corresponding winding induced, the current thereof serving for the release of a signal or for an operation (setting a switch and the like). The magentic circuit of each magnet is at this moment only closed by iron, namely the insertions E and the ring of the box, and by four very narrow air gaps so that the highest possible sensitiveness of the arrangement is obtained.

In Figure 24 only one of the magnets is shown and the position of the remaining ones is indicated by dotted centre lines. $d$ in Figure 25 indicates the linings for the magnet poles of dia-magnetic or good electrical conducting material (copper), which limit the magnetic field in the manner previously explained and screen this from adjacent fields.

I claim:—

1. In a carrier system, a guideway, a carrier, a plurality of rings of magnetically active material spaced predetermined distances apart on the carrier, magnetic fields arranged at corresponding distances apart on the guideway adapted to be simultaneously modified by the rings on the carrier, and means responsive only to the simultaneous modifications of the said magentic fields to influence a local circuit.

2. In a carrier system, a guideway, a carrier, a plurality of rings of magnetically active material spaced predetermined distances apart on the carrier, magnetic fields arranged at corresponding distances apart on the guideway adapted to be simultaneously modified by the rings on the carrier, a local circuit, a plurality of relays each arranged to be energized by current induced by said modification of said magnetic fields, armatures controlled by said relays and arranged in series, and adapted to close said local circuit, and a controlling relay in said local circuit adapted to be energized when said circuit is closed.

3. In a carrier system, a guideway, a carrier, a plurality of rings of magnetically active material spaced predetermined distances apart on the carrier, magnetic fields arranged at corresponding distances apart on the guideway adapted to be simultaneously modified by the rings on the carrier, a local circuit, a cathode tube, the conductor circuits of which are connected with said magnetic fields, and a controlling relay for said local circuit connected with the plate circuit of said cathode tube and adapted to be energized thereby to control said local circuit, said cathode tube being responsive only to the simultaneous modification of the said magnetic fields.

4. A carrier system according to claim 3 in which the winding of one of said magnetic fields arranged to be modified by one of said carrier rings is connected with the grid circuit of said cathode tube, and the winding of another of said magnetic fields arranged to be modified by another of said carrier rings is connected with the anode circuit of said tube, a battery in said first named connection, and a controlling relay in said second connection.

5. A carrier system according to claim 3, in which the induced windings of two simultaneously modified magnetic fields are arranged in two grid circuits of the same cathode tube.

6. A carrier system according to claim 3, in which the induced winding of one magnetic field is arranged in the grid circuit of one cathode tube, the induced winding of a second magnetic field is arranged in one of the circuits of a second cathode tube, which is arranged in series with the first, and a controlling relay arranged in the anode circuit of said second cathode tube.

7. A carrier system according to claim 3, in which the induced winding of one magnetic field is arranged in the grid circuit of one cathode tube, the induced winding of a second magnetic field is arranged in one of the circuits of a second cathode tube, which is arranged in series with the first, a third tube in cascade with the second and acting as an amplifier, and a controlling relay arranged in the anode circuit of said amplifier tube.

8. A carrier system according to claim 1, in which the rings of the carriers are adjustable to different distances apart.

9. A carrier system according to claim 1, in which for the purpose of prolonging the action transmitted by the travelling carrier to the receiver a row of magnetic fields are so arranged adjacent to the guideway that they co-operate in rapid sequence one after another with the same magnetically active rings of the carrier.

10. A carrier system according to claim 1, in which for the purpose of prolonging the action transmitted by the travelling carrier to the receiver a row of magnetic fields are so arranged adjacent to the guideway that they co-operate in rapid sequence one after another with the same magnetically active rings of the carrier, and in which each magnetic field as regards its co-operation with the magnetically active rings of the carrier forms successively the effective part of two pairs of magnetic fields connected one after the other.

11. A carrier system according to claim 1, in which for the purpose of prolonging the action transmitted by the travelling carrier to the receiver a row of magnetic fields are so arranged adjacent to the guideway that they co-operate in rapid sequence one after another with the same magnetically active rings of the carrier, and in which pairs of magnetic fields are arranged so as to interengage with one another in such a manner that the fields have a shorter interval between them than the magnetically active rings of the carrier.

12. A carrier system according to claim 1, in which the currents simultaneously induced in two coils are added together directly in a relay circuit or are multiplied in a rotary field system.

13. A carrier system according to claim 1, in which the currents simultaneously induced in two coils are added together directly in a relay circuit or are multiplied in a rotary field system, and in which the simultaneously induced coils of two permanent magnets are arranged in series with a relay of which the armature releases the desired action.

14. A carrier system according to claim 1, in which the currents simultaneously induced in two coils are added together directly in a relay circuit or are multiplied in a rotary field system, and in which the simultaneously induced coils of two permanent magnets are arranged in series with a relay of which the armature releases the desired action, and in which the cores of the simultaneously active magnets in addition to each being provided with windings which convey the induction currents and which are arranged in series with one another and the operative relay, are each also provided with a winding which is arranged in a short circuit with each of the others.

15. A carrier system according to claim 1, in which the currents simultaneously induced in two coils are added together directly in a relay circuit or are multiplied in a rotary field system, and in which the simultaneously induced windings of the magnets each supply their current to an energizing or disturbing winding of a rotary field system.

16. A carrier system according to claim 1, in which the energizing windings of electromagnets are connected in an economizing circuit to the two circuits co-operating to effect the release of the receiving apparatus.

17. A carrier system according to claim 1, in which the guideway, otherwise consisting of steel, is provided with a brass tube insert in registry with the magnetic fields.

18. A carrier system according to claim 1, in which the guideway, otherwise consisting of steel, is provided with a brass tube insert in registry with the magnetic fields, and in which for the purpose of reducing the magnetic resistance in the field of the magnets, the brass tube insert is of a diameter reduced to a minimum relatively to that of the carrier.

19. A carrier system according to claim 1, in which the guideway, otherwise consisting of steel, is provided with a brass tube insert in registry with the magnetic fields, and in which the brass tube insert is in turn provided with insertions of soft metal, which are arranged opposite the poles of the magnet in such a manner that the magnetic circuit of said magnet is closed by iron and air alone.

20. A carrier system according to claim 1, in which the pole pieces of the field magnets are lined on both sides with a predetermined dia-magnetic material.

In testimony whereof I have affixed my signature.

WALTHER HARLANDT.